US009560515B2

(12) United States Patent
Brianza et al.

(10) Patent No.: US 9,560,515 B2
(45) Date of Patent: Jan. 31, 2017

(54) SYSTEM AND METHOD FOR SUPPLEMENTARY SERVICES SETTING SYNCHRONIZATION

(71) Applicant: Mavenir Systems, Inc., Richardson, TX (US)

(72) Inventors: Carlo Brianza, Milan (IT); Ian McLean Pattison, Edinburgh (GB); Richard Arthur Bodin, Montigny le Bretonneux (FR); Tomasz Maslewski, Reading (GB)

(73) Assignee: Mitel Mobility Inc., Richardson, TX (US)

( * ) Notice: Subject to any disclaimer, the term of this patent is extended or adjusted under 35 U.S.C. 154(b) by 126 days.

(21) Appl. No.: 14/508,078

(22) Filed: Oct. 7, 2014

(65) Prior Publication Data
US 2016/0100306 A1 Apr. 7, 2016

(51) Int. Cl.
*H04W 4/00* (2009.01)
*H04W 8/04* (2009.01)
*H04W 4/12* (2009.01)
*H04W 8/20* (2009.01)

(52) U.S. Cl.
CPC ............... *H04W 8/04* (2013.01); *H04W 4/12* (2013.01); *H04W 8/20* (2013.01)

(58) Field of Classification Search
CPC ............ H04W 8/04; H04W 8/20; H04W 4/12
USPC .......................................... 455/433; 370/338
See application file for complete search history.

(56) References Cited

U.S. PATENT DOCUMENTS

| 8,654,946 B1* | 2/2014 | Patro ...................... H04W 4/16 379/201.01 |
| 2008/0130624 A1* | 6/2008 | Hua ...................... H04M 7/123 370/350 |
| 2009/0029697 A1 | 1/2009 | Bianconi et al. |
| 2010/0041398 A1* | 2/2010 | Sand ...................... H04W 8/20 455/433 |
| 2010/0167705 A1* | 7/2010 | Noldus ............... H04M 7/1235 455/414.1 |

(Continued)

OTHER PUBLICATIONS

Oracle, Oracle® Communications Service Broker Developer's Guide for GSM, Release 5.0, Part No. E20060-01, Developing a Presence and Subscriber Status SIP Application, http://docs.oracle.com/cd/E15438_01/doc.50/e20060/gsm_psxsolution_howto.htm, pp. 1-13 (2010).

(Continued)

*Primary Examiner* — Marcos Batista (57) ABSTRACT

A synch server comprises a first interface configured to transmit and receive MAP messages, and communicate with a Home Location Register (HLR) in a Circuit-Switched (CS) network, a second interface configured to communicate with a Home Subscriber Server (HSS) in an IP-Multimedia Subsystem (IMS) network, and a third interface configured to transmit and receive Extensible Markup Language (XML) Configuration Access Protocol (XCAP) messages. A synch function module is configured to receive a message containing a change to a supplementary service setting associated with a User Equipment (UE) connected to a Circuit-Switched (CS) network or an IMS network, and communicate the change to the supplementary service setting to both the HLR and the HSS so that the supplementary service settings in both the HLR and the HSS are updated to reflect the change to the supplementary service setting.

29 Claims, 6 Drawing Sheets

(56) References Cited

U.S. PATENT DOCUMENTS

2012/0185506 A1    7/2012   Gomez Maturana et al.
2013/0310001 A1   11/2013   Midkiff
2014/0073333 A1    3/2014   Keller et al.

OTHER PUBLICATIONS

3rd Generation Partnership Project (3GPP TM), 3GPP TS 29.002 V10.2.0, 3rd Generation Partnership Project; Technical Specification Group Core Network and Terminals; Mobile Application Part (MAP) specification (Release 10), http://www.qtc.jp/3GPP/Specs/29002-a20.pdf, http://www.3gpp.org, pp. 181-183 (Mar. 2011).
Bart Barton, LTE, 4G, EPC, MME, PGW, SGW, Interfaces and beyond tech-blog by Bart Barton, http://www.lteandbeyond.com/2012/01/lte-attach-procedure.html, pp. 1-8 (Jan. 28, 2012).
Wikipedia, System Architecture Evolution, https://en.wikipedia.org/wiki/System_Architecture_Evolution, pp. 1-8 (Jun. 10, 2014).

\* cited by examiner

SYSTEM AND METHOD FOR SUPPLEMENTARY SERVICES SETTING SYNCHRONIZATION

FIELD

The present disclosure relates to telecommunication networks, and more particularly to a system and method for supplementary services setting synchronization.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more of an Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are used herein interchangeably. A CDMA network may implement a radio technology such as Universal Terrestrial Radio Access (UTRA), cdma2000, etc. UTRA includes Wideband-CDMA (W-CDMA) and Low Chip Rate (LCR) cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long-Term Evolution (LTE) is a new release of UMTS that uses E-UTRA. UTRA, E-UTRA, GSM, UMTS and LTE are described in specification documents from 3GPP. These various radio technologies and standards are known in the art.

Long Term Evolution or LTE is a next generation standard for wireless communication of high-speed data for mobile phones and data terminals. It is based on the GSM/EDGE and UMTS/HSPA (Universal Mobile Telecommunication System/High Speed Packet Access) network technologies, increasing the capacity and speed using new modulation techniques. The IP-based LTE network architecture, called the Evolved Packet Core (EPC) supports seamless handovers for both voice and data to cell towers with older network technology such as GSM, UMTS and CDMA2000. The LTE technology is adapted for a smooth evolution from earlier 3GPP systems. VoLTE or Voice Over LTE is a standardized scheme developed to transmit voice traffic over the IP-based LTE network.

The Evolved Packet Core (EPC) is the latest evolution of the 3GPP core network architecture first introduced in Release 8 of the standard. In EPC, the user data and the signaling data are separated into the user plane and the control plane. The EPC is composed of four basic network elements: the Serving Gateway (SGW), the Packet Data Network Gateway (PDN GW or PGW), the Mobility Management Entity (MME), and the Home Subscriber Server (HSS). The EPC is connected to external networks, which can include the IP Multimedia Core Network Subsystem (IMS).

The Home Location Register (HLR) in the CS core network and the Home Subscriber Server (HSS) in the IMS are typically the network nodes that contain master copies of the subscriber profile databases. The data stored in the databases include data such as Mobile Subscriber Integrated Service Digital Network (MSISDN) number, International Mobile Subscriber Identity (IMSI) number, Subscriber Identity Module (SIM) card details, service selections, and General Packet Radio Service Tunneling (GPRS) as well as Universal Mobile Telecommunications System (UMTS) settings. The database is also used to store a master copy of supplementary services parameters for each subscriber. Supplementary services settings stored in the database may include multi-party service (MPTY), explicit call transfer (ECT), call deflection (CD), call forwarding (CF), call hold (CH), and call barring.

DETAILED DESCRIPTION

This disclosure describes a system and method for ensuring changes to the supplementary services settings in the subscriber profile is propagated to both the Home Location Register (HLR) in the CS core network and the Home Subscriber Server (HSS) in the IMS network.

Figure 1:
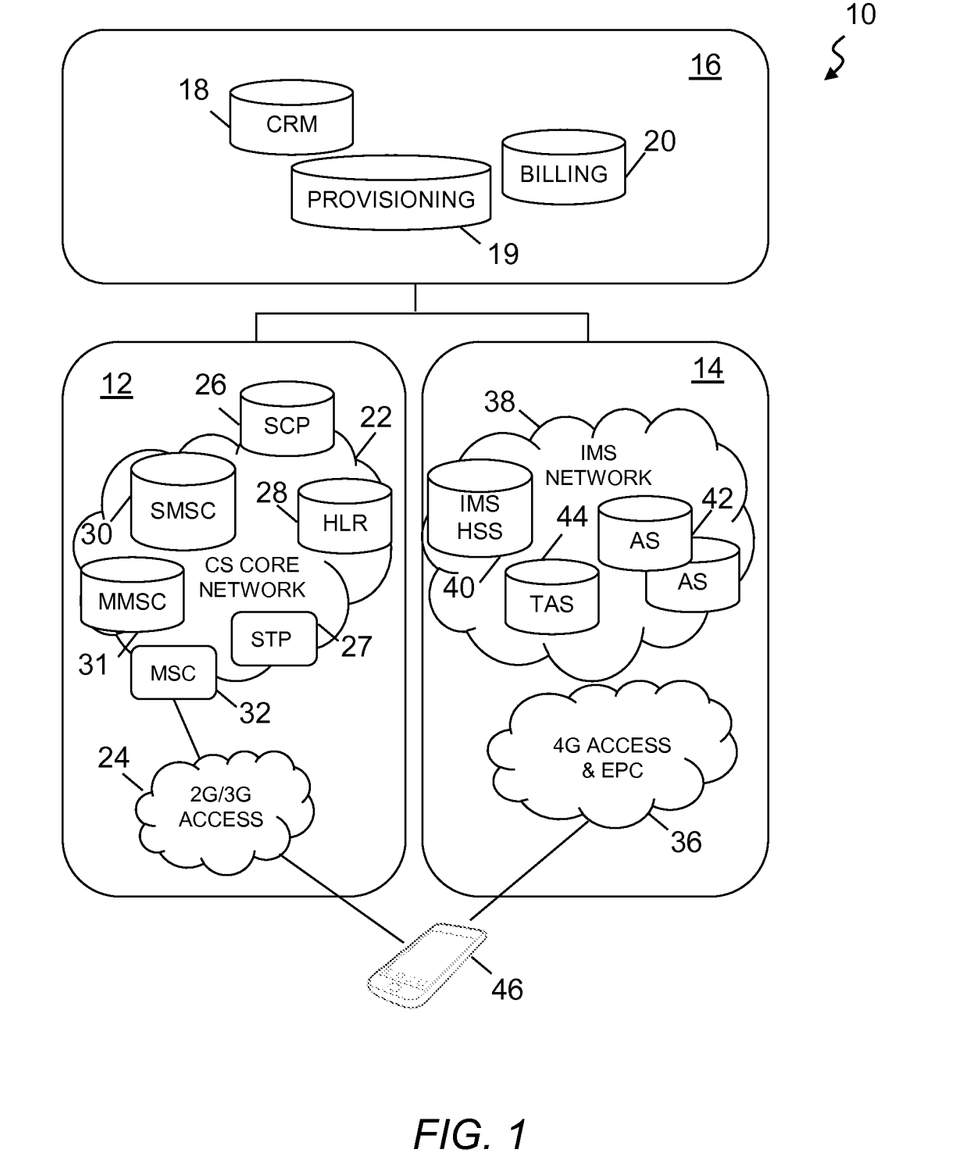
FIG. 1 is a simplified block diagram of a conventional telecommunication network including legacy networks and next generation networks.

FIG. 1 is a simplified block diagram of a conventional telecommunication network 10 including legacy networks 12 and next generation networks 14. The telecommunication network 10 includes a customer care system 16 that provides Operations Support System (OSS) and Business Support System (BSS) functionalities. OSS enables operations and IT personnel to administer operational processes focusing on the network and services, including service quality monitoring, network and server performance, logical and physical resources management, and provisioning. BSS is used to manage business operations that focus on billing, rating, sales management, customer service management, and customer databases. The customer care system 16 includes a plurality of databases, including Customer Relationship Management (CRM) 18, provisioning 19, and billing 20.

The telecommunication network 10 further includes legacy networks 12, such as a Circuit Switched (CS) core network 22 and 3G access network 24 for delivering traditional GSM/UMTS services such as voice calls, short message service, and circuit switched data calls. The CS core network 22 include Intelligent Network (IN) SS7 nodes such as Service Control Point (SCP) 26 and Signaling Transfer Point (STP) 27. The SCP 26 is primarily a database that provides information necessary for advanced call processing capabilities. The STP 27 is the router or switch of signaling messages in the SS7 network.

The Home Location Register (HLR) 28 in the CS core network 22 contains a master copy of the subscriber profile database. The data stored in the databases include data such as Mobile Subscriber Integrated Service Digital Network (MSISDN) number, International Mobile Subscriber Identity (IMSI) number, Subscriber Identity Module (SIM) card details, service selections, and General Packet Radio Service Tunneling (GPRS) as well as Universal Mobile Telecommunications System (UMTS) settings. The HLR 28 also includes supplementary service settings associated with the subscriber, including settings for multi-party service (MPTY), explicit call transfer (ECT), call deflection (CD), call forwarding (CF), call hold (CH), call barring, etc. The CS core network 22 also includes the Short Message Service Center (SMSC) 30 and Multimedia Messaging Service Center (MMSC) 31 that handle the processing and services for Short Messages Service (SMS) and Multimedia Service (MMS).

The legacy network 12 further includes the Mobile Switching Center (MSC) 32, which is the primary service delivery node for GSM, UMTS, and CDMA in the Circuit Switched domain and is responsible for routing, for example, voice calls, SMS, and circuit switched data.

The telecommunication network 10 also includes next generation networks 14, including 4G access network and Evolved Packet Core (EPC) 36, and IP Multimedia Subsystem (IMS) 38. The 4G access network may include, for example, an Evolved UMTS Terrestrial Radio Access Network (E-UTRAN). The EPC may include a Mobility Management Entity (MME), a Serving Gateway (SGW), and a Packet Data Network (PDN) Gateway (PGW). These network elements are known in the art and defined in the standards.

The IMS 38 is a network that primarily uses Session Initiation Protocol (SIP) to deliver IP multimedia services. The IMS network 38 includes Call Session Control Function (CSCF) servers (Interrogating-CSCF, Proxy-CSCF, and Serving-CSCF; not explicitly shown) and an IMS Home Subscriber Server (HSS) 40, which includes a master copy of the subscriber profile database that contains subscriber and service-related information. The HSS subscriber database contains the IP Multimedia Public User Identity (IMPU), IP Multimedia Private User Identity (IMPI), IMSI, MSISDN, subscriber service profiles, service triggers, and other information. The IMS HSS 40 supports the IMS network entities that handle calls. It also provides support functions in mobility management, call and session setup, user authentication, and access authorization.

The Application Servers (AS) 42 of the IMS network 38 are SIP servers that provide the functionalities of hosting and executing various services and application functions. An AS 42 provides specific services to the subscriber, which may include multiparty gaming, videoconferencing, messaging, community services, presence, and content sharing.

The IMS network 38 also includes a Telephony Application Server (TAS) 44. The TAS 44 typically includes the service logic that provides the basic call processing services including digit analysis, routing, call setup, call waiting, call forwarding, conferencing, etc. The TAS 44 preferably supports rich multimedia services such as HD voice and video calling to subscribers on LTE, Wi-Fi, Fixed or Business networks, as well as the integrated mobility features to enable service continuity to move from one access network to another.

The legacy networks 12 and next generation networks 14 can be accessed by a User Equipment (UE) 46. Examples of an UE 46 include a cellular phone, a smart phone, a session initiation protocol SIP phone, a laptop, a personal digital assistant PDA, a satellite radio, a global positioning system, a multimedia device, a video device, a digital audio player e.g., MP3 player, a camera, a game console, or any other similar functioning device. The UE 46 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

It should be noted that the UE 46 can reach the EPC using E-UTRAN and other access technologies specified by 3GPP. Existing 3GPP radio access networks are also supported. 3GPP specifications define how the interworking is achieved between an E-UTRAN LTE and LTE-Advanced, GERAN radio access network of GSM/GPRS and UTRAN radio access network of UMTS-based technologies WCDMA and HSPA. The Evolved Packet Subsystem (EPS) also allows non-3GPP technologies to interconnect the UE and the EPC. The term "non-3GPP" means that these access technologies were not specified in the 3GPP. These include, e.g., WiMAX, cdma2000, WLAN and fixed networks. Non-3GPP access technologies can be further classified as "trusted" and "untrusted" access networks. Trusted non-3GPP accesses can interface directly with the EPC. However, untrusted non-3GPP accesses interwork with the EPC via a network entity called the Evolved Packet Data Gateway (ePDG). The main role of the ePDG is to provide security mechanisms such as IP Security (IPsec) tunneling of connections with the UE over an untrusted non-3GPP network access, such as CDMA and WLAN technologies.

It may be seen from the foregoing that the HLR 28 in the CS core network 12 and the HSS 40 in the IMS 38 are the network nodes or entities that store the subscriber profile databases. These databases are also used to store master copies of supplementary services parameters for each subscriber. Accordingly, these two copies of the subscriber profile data and supplementary services parameters must be synchronized to ensure that the user is serviced in a consistent way across both the legacy networks 12 and the next generation networks 14. Therefore, subscriber profile parameters that are applicable to both domains must be maintained and updated. When the customer care system 16 (or BSS and OSS) makes a change in the subscription services for a subscriber, the data related to the new or changed services must be propagated to both the HLR 28 and the IMS HSS 40 by the operator or customer care system 16 in order to ensure consistent provisioning of the service data. However, the subscriber typically has the ability to make changes to the supplementary services directly using his/her UE without assistance from the operator or customer care system 16. While connected to the IMS network 38, supplementary service modifications may be made by the user through the Ut interface, which makes use of the XML Configuration Access Protocol (XCAP) [3GPP TS 24.623] for the purpose of modifying, via the TAS 44, the supplementary service data stored in the IMS HSS database 40. While connected to the CS core network 22, modifications to the supplementary services may be made by the user and the changes are typically transmitted by the UE using Direct Transfer Application Part (DTAP) messages to register, erase, activate, deactivate the supplementary services in the HLR database 28 via the MSC 32. When changes are made to the supplementary service settings via the user's UE without assistance from customer care, the changes made to the subscriber profile database in one domain must be reflected in the subscriber profile database in the other domain.

Figure 2:
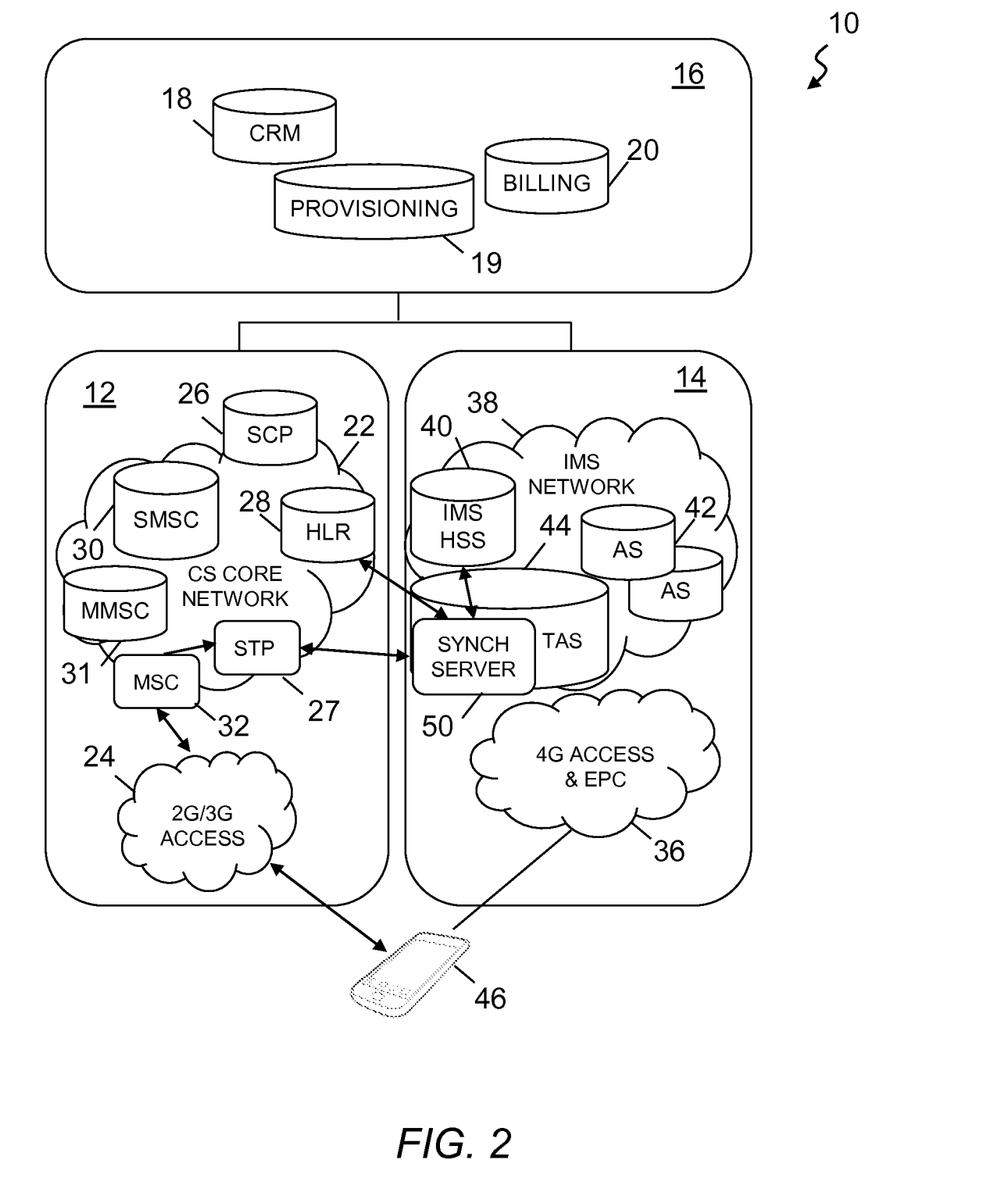
FIG. 2 is a simplified block diagram of an exemplary embodiment of a system and method for supplementary services data synchronization to support VoLTE User Equipment according to the present disclosure.
Figure 3:
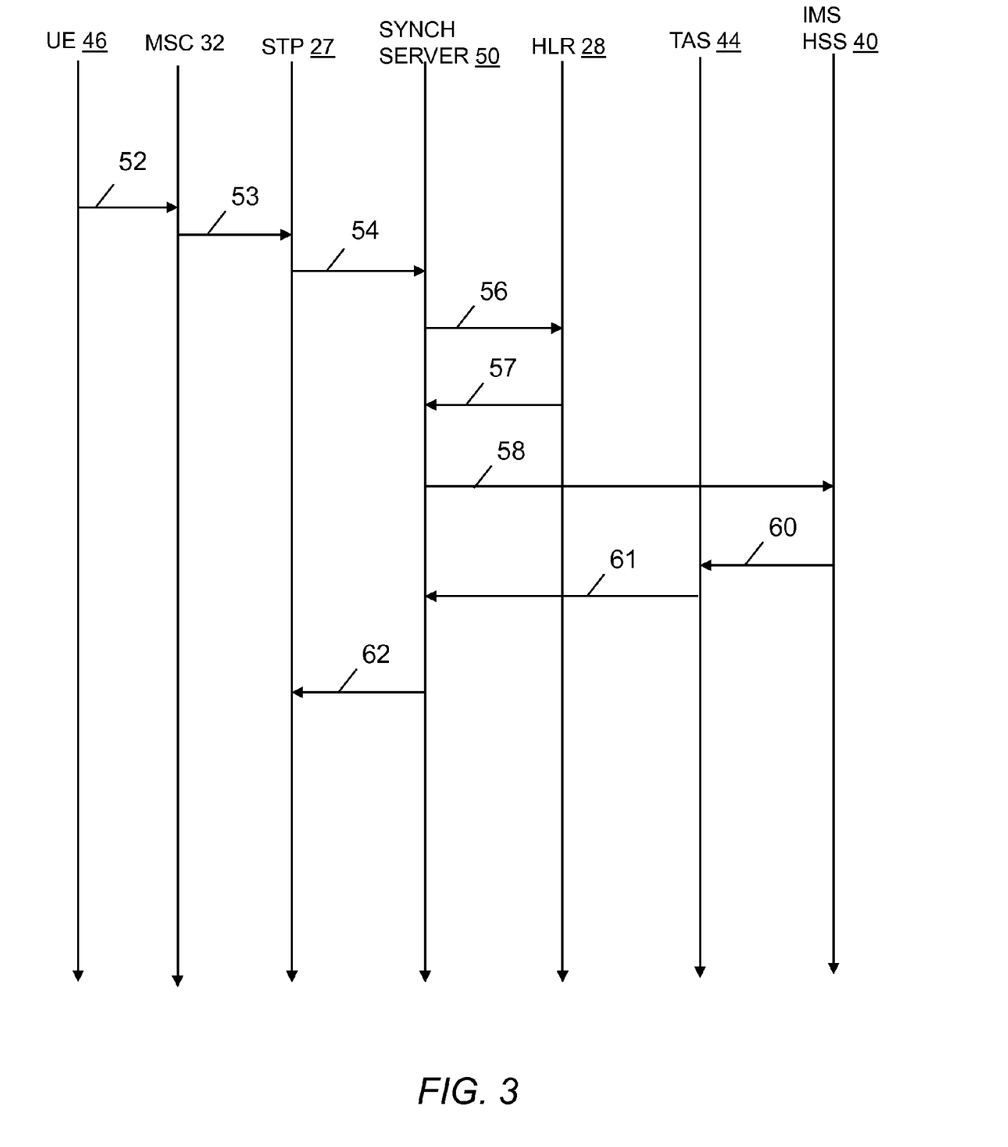
FIG. 3 is a simplified message flow diagram of an exemplary embodiment of a system and method for supplementary services data synchronization according to the present disclosure.

The description below makes references to both FIGS. 2 and 3, where FIG. 2 is a simplified block diagram of an exemplary embodiment of a system and method for supplementary services data synchronization to support VoLTE User Equipment, and FIG. 3 is a simplified message flow diagram of an exemplary embodiment of a system and method for supplementary services data synchronization. As shown in FIG. 2, a new network functionality, node, or entity, the Synch Server 50, is added to the next generation network 14. Preferably, the Synch Server 50 includes a software or logic module that is associated with (e.g., resides on or is co-located with) a network node or entity that has connectivity to both the HLR 28 and the IMS HSS 40. A preferred example of this network node is the TAS 44, but the Synch Server 50 may be a stand-alone network node or entity, or may reside on one or more other suitable network nodes or entities. In general, the Synch Server 50 may be composed of hardware, software, firmware, or a combination of these technologies.

As described above, the user may make modifications to the supplementary services using his/her mobile device or UE 46. FIGS. 2 and 3 illustrate an exemplary process for synchronizing the supplementary service data when the user initiates changes to the data while connected to the CS core network 22. The modifications are transmitted to the MSC 32 in the form of DTAP messages that identify the UE (and subscriber) requesting the change (52). The MSC 32 then converts such DTAP messages into the corresponding MAP-based messages (e.g., MAP_REGISTER_SS, MAP_ERASE_SS, MAP_ACTIVATE_SS, and MAP_DE-ACTIVATE_SS), which are transmitted to the HLR, typically via an STP 27 (53). The STP 27 is configured to route all MAP messages with operation code corresponding to the above supplementary service-related messages to the Synch Server 50 (54). The following table shows the MAP operations codes defined in the 3GPP standard for the MAP messages that cause a change of the supplementary services settings in the subscriber profile:

| MAP Message | Operations Code |
| --- | --- |
| RegisterSS | 00001010 |
| EraseSS | 00001011 |
| ActivateSS | 00001100 |
| DeactivateSS | 00001101 |

The Synch Server 50 forwards the MAP message to the HLR 28 (56). If there is no error, the HLR 28 stores the requested changes to the supplementary service settings and returns a success indication to the Synch Server 50 (57). If, on the other hand, the HLR 28 returns an error message to the Synch Server 50, then the Synch Server 50 relays the error response to the STP 27, which in turn transmits the error message back to the UE 46 via the MSC 32. The user may be notified by a message that the supplementary service modification was unsuccessful.

If the HLR response to the supplementary service change is positive (57), then the Synch Server 50 generates a Diameter Sh command that reflects the supplementary service modification, and sends the Sh command to the IMS HSS 40 to update the subscriber profile data stored in its database (58). The Sh interface is defined in the standard as the method of communication between the TAS 44 (or AS 42) and the HSS to query or update the data stored in the HSS 40. The IMS HSS 40 returns to the Synch Server 50 (via TAS 44) an indication of success or error (60 and 61). If the update is successful, the Synch Server 50 relays the success response to the STP 27 (62), which may return a success message to the UE 46 via the MSC 32.

However, if the update to the IMS HSS is not successful, there are at least two options proposed to handle the error. The first option is for the Synch Server 50 to generate a suitable MAP message to restore the previous status of the supplementary service setting in the HLR 28 that existed prior to the update, and build a negative MAP response toward the STP 27. This restore process would entail first reading and storing the supplementary service settings from the HLR prior to attempting the data change/update, and then if the error occurred in updating the IMS HSS, the changes in the HLR are rolled back, or restored to the previous supplementary service settings. In this way, the subscriber-triggered changes to the supplementary service settings are not successful and are not implemented.

The second option when the IMS HSS update is not successful is to send a positive response to the STP 27 but generate a database misalignment entry in a log to trigger intervention of the operator or customer care personnel. The operator may then correct or update the supplementary service setting in the IMS HSS 40 so that the data in the HLR and the IMS HSS are synchronized and remain synchronized.

It should be noted that the Synch Server 50 is configured to timestamp and log all operations and results to facilitate audit and verification tasks. Preferably, a log entry is written prior to updating either database, after the first database is updated, and then after the second database is updated. The Synch Server 50 is further configured to trigger an alarm or red flag whenever update to one database is not done to the other database in order to alert the operator or customer care personnel. Further, upon system startup or recovery, the log file can be reviewed to ensure that changes to the two databases are mirrored and that the data are synchronized. Further, periodic or scheduled database audits may be performed to ensure the supplementary services settings in both databases are synchronized.

A network entity, GSM Service Control Function (gsmSCF), is part of the Customized Applications for Mobile Networks Enhanced Logic (CAMEL) that enables the operator to define services over and above standard GSM/UMTS services. The STP 27 may receive a MAP message associated with an Any-Time-Modification (ATM) operation from gsmSCF over the Si interface to affect changes to the subscription data related to the supplementary services setting. When the STP 27 receives a MAP ATM message that relates to changes to the supplementary service settings, the STP similarly forwards this message to the Synch Server 50, which in turn updates the HLR 28 and the IMS HSS 40 in the same manner as described above.

Figure 4:
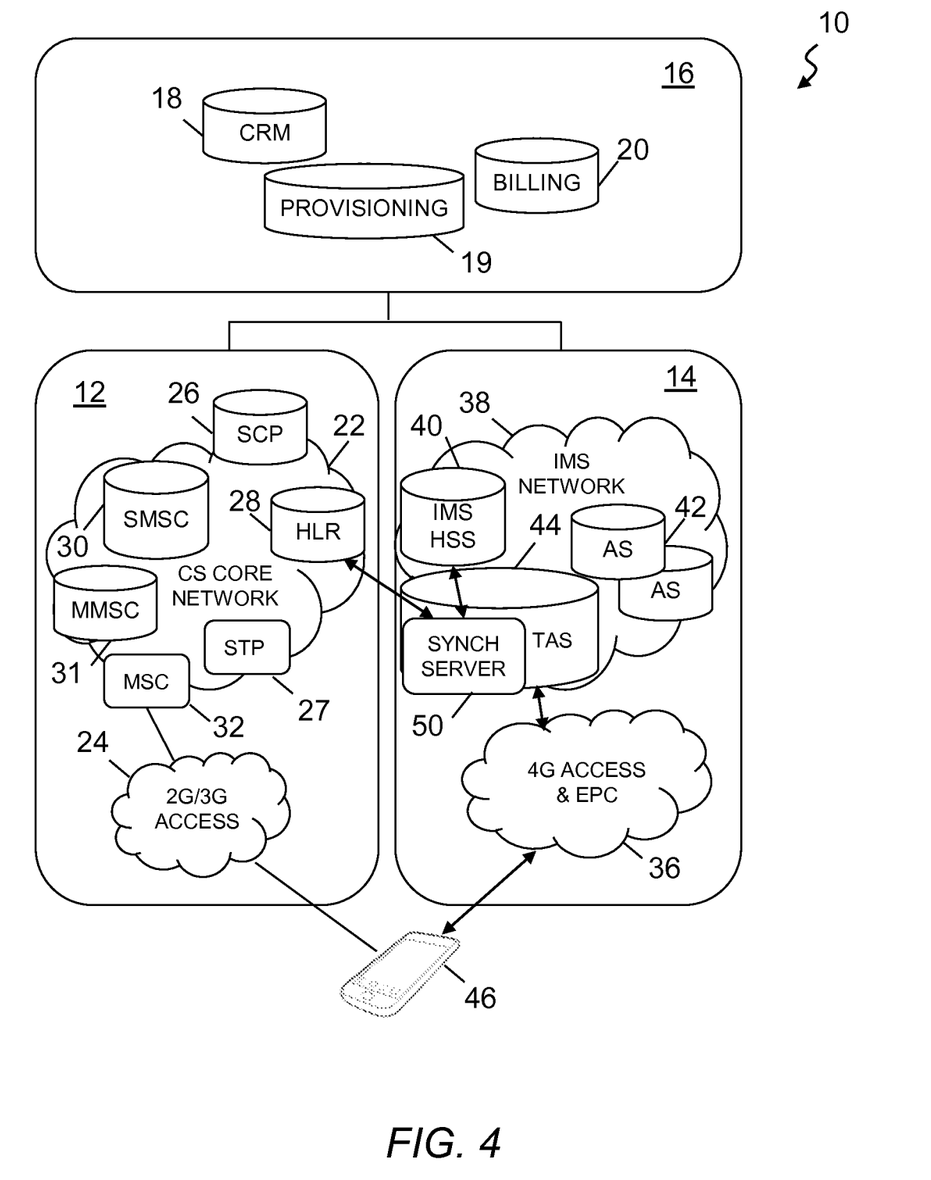
FIG. 4 is a simplified block diagram of another exemplary embodiment of a system and method for supplementary services data synchronization to support VoLTE User Equipment according to the present disclosure.
Figure 5:
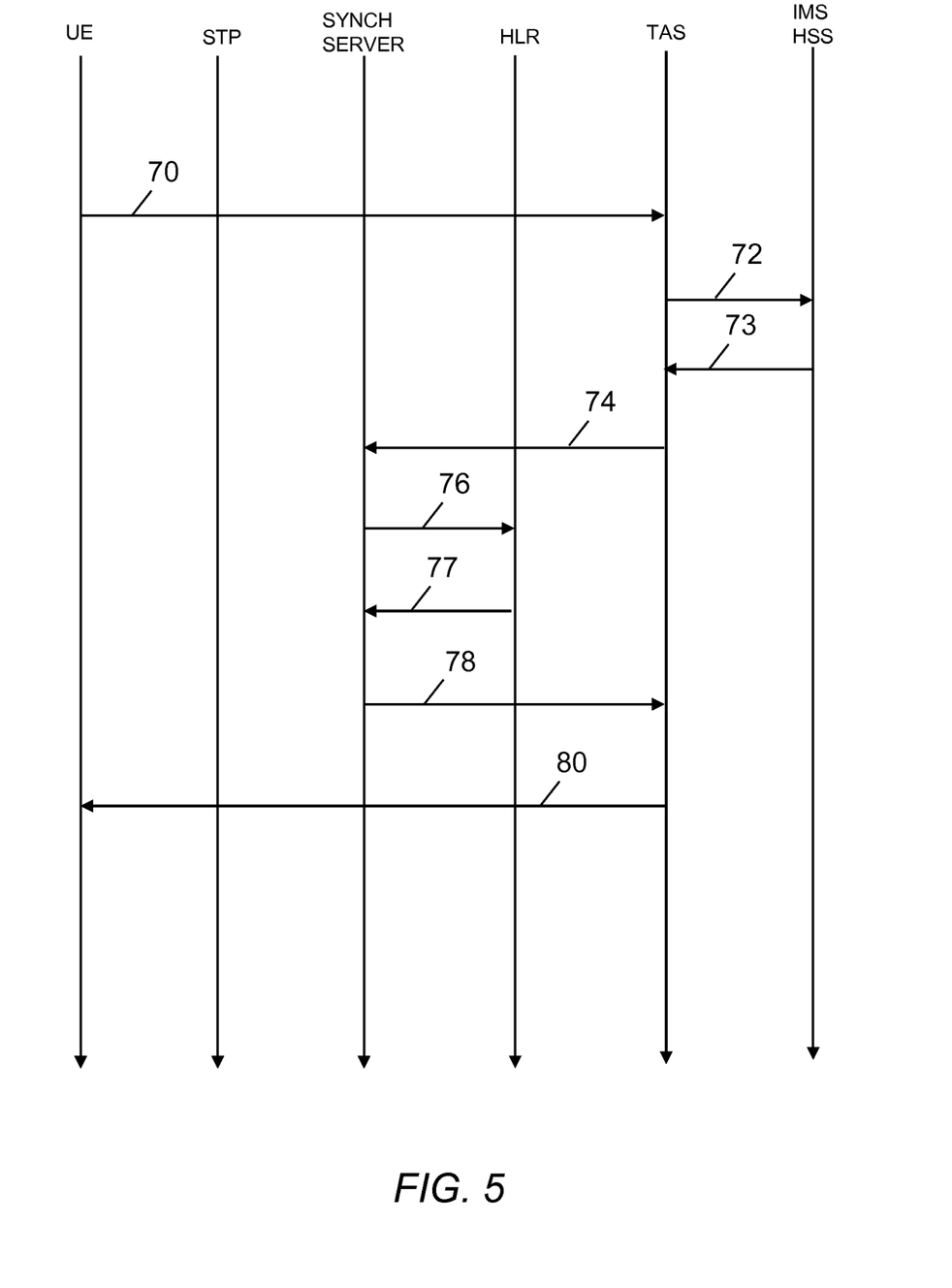
FIG. 5 is a simplified message flow diagram of another exemplary embodiment of a system and method for supplementary services data synchronization according to the present disclosure.

The following description makes references to both FIGS. 4 and 5, where FIG. 4 is a simplified block diagram of another exemplary embodiment of a system and method for supplementary services data synchronization to support VoLTE User Equipment, and FIG. 5 is a simplified message flow diagram of another exemplary embodiment of a system and method for supplementary services data synchronization according to the present disclosure. As described above, the user may make modifications to the supplementary services using his/her mobile device or UE 46. FIGS. 4 and 5 illustrate an exemplary process for synchronizing the supplementary service data when the user initiates changes to the data while connected to the IMS network 38. The modifications to the supplementary service settings are transmitted using the Extensible Markup Language (XML) Configuration Access Protocol (XCAP) via the Ut interface to the TAS 44 (70). The TAS 44 converts the transmitted information to an Sh command to update the IMS HSS 40 (72). The TAS 44 then receives a response back from the IMS HSS 40 (73). If the update to the IMS HSS is successful, the TAS 44 passes the supplementary service modification to the Synch Server 50 (74), which preferably resides on the TAS 44. The Synch Server 50 builds a MAP message that includes the supplementary service setting modification and sends it to the HLR 28 (76). The Synch Server 50 may transmit the MAP message to the HLR 28 directly or via the STP 27. The HLR 28 then responds by sending back a message to the Synch Server 50 (77). The Synch Server 50 then passes the HLR response to the TAS 44 (78). If the HLR response is positive, meaning that the subscriber profile data in the HLR 28 have been updated successfully, then the TAS 44 sends a positive response back to the UE 46 via the Ut interface (80).

If however the HLR response indicates an error, there are at least two options to handle this situation. The first option includes the TAS 44 sending an Sh command to the IMS HSS 40 to restore the previous status of the supplementary service settings in the subscription data that existed prior to the update, and report the error to the UE 46 via the Ut interface. This restore process would entail first reading and storing the supplementary service settings from the IMS HSS prior to attempting the data change/update, and then if the error occurred in updating the HLR, the changes in the IMS HSS are rolled back, or restored to the previous supplementary service settings. In this way, the subscriber-triggered changes to the supplementary service settings are not successful and are not implemented.

The second option includes keeping the IMS HSS supplementary service setting update, reporting a positive response to the UE 46, but generating a database misalignment log entry in order to trigger the intervention of the operator or customer care personnel. The operator may then correct or update the supplementary service setting in the HLR 28 so that the data in the HLR and the IMS HSS are synchronized.

It should be noted again that the Synch Server 50 is configured to log all update/modification operations and results with timestamp to facilitate audit and verification tasks. Preferably, log entries are made prior to updating either database, after the first database is updated, and then after the second database is updated. The Synch Server 50 is further configured to trigger an alarm or red flag whenever update to one database is not done to the other database in order to alert the operator or customer care personnel. Further, upon system startup or recovery, the log file can be reviewed to ensure that changes to the two databases are mirrored and that the data are synchronized. Further, periodic or scheduled database audits may be performed to ensure the supplementary services settings in both databases are synchronized.

It should be further noted that there may be supplementary services available or supported in one domain but not the other. For example, legacy networks do not support Communications Diversion (CDIV) and Call Barring capabilities that are supported in the next generation networks. Therefore, when a database update involves a supplementary service that is not supported in the other domain, the mismatch in supplementary service settings in the database is anticipated and accounted for.

In this disclosure, the terms "module," "node," and "entity" may be used to refer to a physical circuit, a collection of hardware components, a logical module, firmware, software (applications, functions, subroutines, etc.), functional module, and/or a combination of the above.

Figure 6:
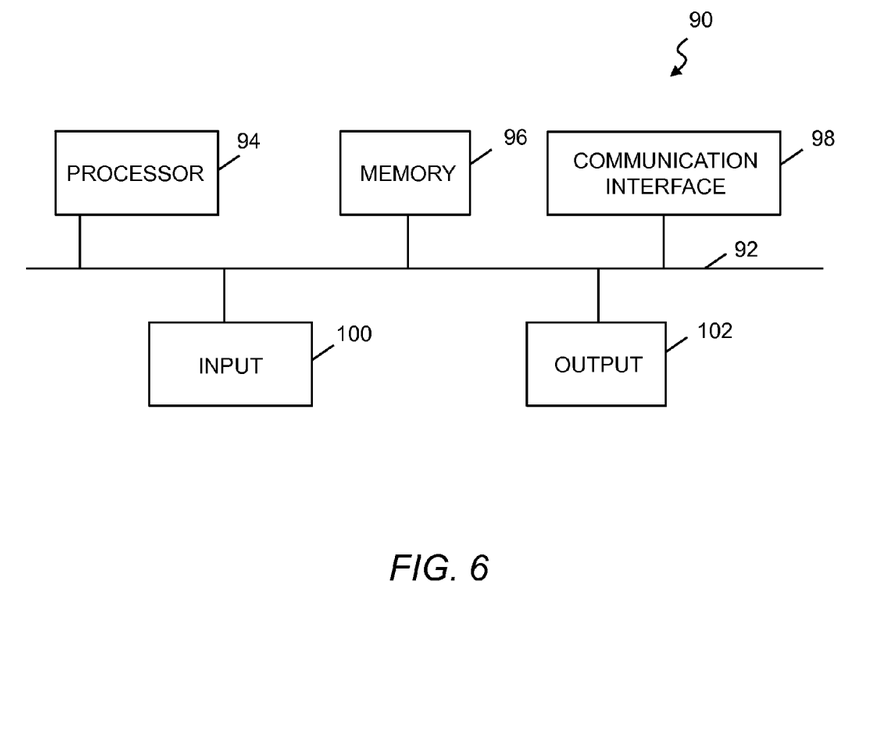
FIG. 6 is a simplified block diagram of an exemplary embodiment of a network node on which the synch server resides according to the present disclosure.

Referring to FIG. 6, an exemplary network node or entity 90 such as TAS 44 on which the synch server 50 resides may include a bus 92 interconnecting a processor 94, a memory 96, a communication interface 98, an input device 100, and an output device 102. The bus 92 enables communication among the components of network node 90. The processor 94 may include one or more processing units or microprocessors that interpret and execute coded instructions. In other implementations, the processor 94 may be implemented by or include one or more application-specific integrated circuits (ASICs), field programmable gate arrays (FPGAs), or the like.

The memory 96 may include a random access memory (RAM) or another type of dynamic storage device that stores information and instructions for execution by the processor 94. The memory 96 may also include a read-only memory (ROM) or another type of static storage device that stores static information and instructions for the processor 94. The memory 96 may further include other types of magnetic or optical recording medium and its corresponding drive for storing information and/or instructions.

The communication interface 98 may include any transceiver-like device and antenna that enables the network node 90 to communicate via radio frequency with other devices and/or systems. The communication interface 158 may further include interfaces, ports, or connectors to other devices.

The input 100 may include one or more devices that permit an operator to enter information to the network node 90, such as a keyboard, a keypad, a mouse, a pen, a touch-sensitive pad or screen, a microphone, one or more biometric mechanisms, and the like. The output 102 may include one or more devices that outputs information to the operator, such as a display, a printer port, a speaker, etc.

As described herein, the network node 90 may perform certain operations in response to the processor 94 executing software instructions contained in a computer-readable medium, such as memory 96. A computer-readable medium may be defined as a physical or logical memory device. A logical memory device may include memory space within a single physical memory device or spread across multiple physical memory devices. The software instructions may be read into memory 96 from another computer-readable medium or from another device via a communication interface 98. The software instructions contained in the memory 96 may cause processor 94 to perform processes described herein. Alternatively, hardwired circuitry may be used in place of or in combination with software instructions to implement processes described herein. Thus, implementations described herein are not limited to any specific combination of hardware circuitry and software.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

GLOSSARY

AS Application Server
ATM Any-Time-Modification
BSS Business Support System
CAMEL Customized Applications for Mobile Networks Enhanced Logic
CD Call Deflection
CDIV Communications Diversion
CDMA Code Division Multiple Access
CF Call Forwarding
CH Call Hold
CMPG Converged Media Packet Gateway
CRM Customer Relationship Management
CS Circuit Switched
CSCF Call Session Control Function
DTAP Direct Transfer Application Part
ECT Explicit Call Transfer
EPC Evolved Packet Core
EPS Evolved Packet Subsystem
E-UTRAN Evolved UMTS Terrestrial Radio Access Network
FDMA Frequency Division Multiple Access
GGSN Gateway GPRS Support Node
GPRS General Packet Radio Service
GSM Global System for Mobile Communications
GTP GPRS Tunneling Protocol
HLR Home Location Register
HSPA High Speed Packet Access
HSS Home Subscriber Server
ICS IMS Centralized Services
I-CSCF Interrogating-Call Session Control Function
IMS IP-Multimedia Subsystem
IMPI IP Multimedia Private User Identity
IMPU IP Multimedia Public User Identity
IMSI International Mobile Subscriber Identity
IP Internet Protocol
ITU International Telecommunications Union
LTE Long Term Evolution
MAP Mobile Applications Part
MMO Mobility Management Entity
MMSC Multimedia Messaging Service Center
MNO Mobile Network Operator
MPTY Multi-Party Service
MSC Mobile Switching Center
MSISDN Mobile Subscriber Integrated Service Digital Network
OFDMA Orthogonal FDMA
OSS Operations Support System
P-CSCF Proxy Call Session Control Function
PDN GW Packet Data Network Gateway
PDP Packet Data Protocol
PGW Packet Data Network Gateway
POP Point of Presence
SBC Session Border Controller
SCP Service Control Point
S-CSCF Serving-Call Session Control Function
SGSN Serving GPRS Support Node
SGW Serving Gateway
SMSC Short Message Service Center
STP Signaling Transfer Point
TAS Telephony Application Server
TDMA Time Division Multiple Access
UE User Equipment
UMTS Universal Mobile Telecommunication System
UTRA Universal Terrestrial Radio Access
UTRAN Universal Terrestrial Radio Access Network
VoIP Voice over Internet Protocol
VoLTE Voice over LTE
W-CDA Wideband-CDM
W-CDMA Wideband Code Division Multiple Access
XCAP XML Configuration Access Protocol
XML Extensible Markup Language

What is claimed is:

1. A synch server comprising:
    a Mobile Applications Part (MAP) interface configured to transmit and receive MAP messages from a Circuit-Switched (CS) network and communicate with a Home Location Register (HLR) in the CS network;
    an Sh interface configured to communicate with a Home Subscriber Server (HSS) in an IP-Multimedia Subsystem (IMS) network;
    a Ut interface configured to transmit and receive Extensible Markup Language (XML) Configuration Access Protocol (XCAP) messages;
    a synch function module configured to:
        receive a MAP message, via the MAP interface, related to a change to a supplementary service setting associated with a subscriber;
        forward the received MAP message to the HLR;
        receive a response from the HLR indicative of successful supplementary service setting update in the HLR;
        generate an Sh command related to the change to the supplementary service setting related to the subscriber in the received MAP message;
        forward the Sh command to the HSS; and
        receive a response from the HSS indicative of successful supplementary service setting update in the HSS; and
    the synch function module further configured to:
        receive an XCAP message, via the Ut interface, related to a change to a supplementary service setting associated with a subscriber;
        generate an Sh command related to the change to the supplementary service setting related to the subscriber in the received XCAP message;
        forward the Sh command to the HSS;
        receive a response from the HSS indicative of successful supplementary service setting update in the HSS;
        generate a MAP message related to the change to the supplementary service setting related to the subscriber in the received XCAP message;
        forward the MAP message to the HLR; and
        receive a response from the HLR indicative of successful supplementary service setting update in the HLR.

2. The synch server of claim 1, wherein the synch function module is further configured to generate and transmit an error response message in response to an error in updating the supplementary service setting in one of the HLR and HSS.

3. The synch server of claim 1, wherein the synch function module is further configured to:

receive an error message from the HSS in response to an error in updating the supplementary service setting after the supplementary service setting in the HLR is already updated; and restore the supplementary service setting in the HLR that existed prior to the update.

4. The synch server of claim 1, wherein the synch function module is further configured to:

receive an error message from the HLR in response to an error in updating the supplementary service setting after the supplementary service setting in the HSS is already updated; and restore the supplementary service setting in the HSS that existed prior to the update.

5. The synch server of claim 1, wherein the synch function module is further configured to:

receive an error message from the HSS in response to an error in updating the supplementary service setting after the supplementary service setting in the HLR is already updated; and record an HLR and HSS database misalignment alert entry in a log file.

6. The synch server of claim 1, wherein the synch function module is further configured to:

receive an error message from the HLR in response to an error in updating the supplementary service setting after the supplementary service setting in the HSS is already updated; and record an HLR and HSS database misalignment alert entry in a log file.

7. The synch server of claim 1, wherein the synch function module is further configured to generate a MAP message reporting supplementary service setting update success and transmit the message to a User Equipment originating the supplementary service setting change via the MAP interface.

8. The synch server of claim 1, wherein the synch function module is further configured to generate a XCAP message reporting supplementary service setting update success, and transmit the message to a User Equipment originating the supplementary service setting change via the Ut interface.

9. The synch server of claim 1, wherein the synch function module is further configured to receive a MAP message related to a change to a supplementary service setting associated with an My-Time-Modification (ATM) operation, transmit the change to the supplementary service setting in the form of an Sh command and transmit the change to the HSS, and in the form of a MAP message and transmit the change to the HLR.

10. The synch server of claim 1, wherein the synch function module is further configured to timestamp and log each supplementary service setting update operation.

11. A synch server associated with a Telephony Application Server (TAS) comprising:

a first interface configured to transmit and receive a first type of messages from a Circuit-Switched (CS) network and communicate with a Home Location Register (HLR) in the CS network;

a second interface configured to communicate with a Home Subscriber Server (HSS) in an IP-Multimedia Subsystem (IMS) network using a second type of messages;

a synch function module configured to receive a first type of message containing a change to a supplementary service setting associated with a User Equipment (UE) connected to a Circuit-Switched (CS) network, and communicate the change to the supplementary service setting to both the HLR and the HSS so that the supplementary service settings in both the HLR and the HSS are updated to reflect the change to the supplementary service setting; and the synch function module further configured to receive a third type of message via a third interface containing a change to a supplementary service setting associated with a User Equipment (UE) connected to an IMS network, and communicate the change to the supplementary service setting to both the HLR and the HSS so that the supplementary service settings in both the HLR and the HSS are updated to reflect the change to the supplementary service setting.

12. The synch server of claim 11, wherein the synch function module is further configured to:

receive the MAP message, via the first interface, related to the change to a supplementary service setting associated with a subscriber and the UE;

forward the received MAP message to the HLR;

receive a response from the HLR indicative of successful supplementary service setting update in the HLR;

generate an Sh command related to the change to the supplementary service setting related to the subscriber in the received MAP message;

forward the Sh command to the HSS via the second interface; and receive a response from the HSS indicative of successful supplementary service setting update in the HSS.

13. The synch server of claim 11, wherein the synch function module is further configured to:

receive the XCAP message, via the third interface, related to a change to a supplementary service setting associated with a subscriber and the UE;

generate an Sh command related to the change to the supplementary service setting related to the subscriber in the received XCAP message;

forward the Sh command to the HSS via the second interface;

receive a response from the HSS indicative of successful supplementary service setting update in the HSS;

generate a MAP message related to the change to the supplementary service setting related to the subscriber in the received XCAP message;

forward the MAP message to the HLR via the first interface; and receive a response from the HLR indicative of successful supplementary service setting update in the HLR.

14. The synch server of claim 11, wherein the synch function module is further configured to receive a MAP message, via the first interface, related to a change to a supplementary service setting associated with an Any-Time-Modification (ATM) operation, transmit the change to the supplementary service setting in the form of an Sh command and transmit the change to the HSS, and in the form of a MAP message and transmit the change to the HLR.

15. The synch server of claim 11, wherein the synch function module is further configured to generate and transmit an error response message in response to an error in updating the supplementary service setting in one of the HLR and HSS.

16. The synch server of claim 11, wherein the synch function module is further configured to:

receive an error message from the HSS in response to an error in updating the supplementary service setting after the supplementary service setting in the HLR is already updated; and restore the supplementary service setting in the HLR that existed prior to the update.

17. The synch server of claim 11, wherein the synch function module is further configured to:
  receive an error message from the HLR in response to an error in updating the supplementary service setting after the supplementary service setting in the HSS is already updated; and
  restore the supplementary service setting in the HSS that existed prior to the update.

18. The synch server of claim 11, wherein the synch function module is further configured to:
  receive an error message from the HSS in response to an error in updating the supplementary service setting after the supplementary service setting in the HLR is already updated; and
  record an HLR and HSS database misalignment alert entry in a log file.

19. The synch server of claim 11, wherein the synch function module is further configured to:
  receive an error message from the HLR in response to an error in updating the supplementary service setting after the supplementary service setting in the HSS is already updated; and
  record an HLR and HSS database misalignment alert entry in a log file.

20. The synch server of claim 11, wherein the synch function module is further configured to generate a MAP message reporting supplementary service setting update success and transmit the message to a User Equipment originating the supplementary service setting change via the first interface.

21. The synch server of claim 11, wherein the synch function module is further configured to generate a XCAP message reporting supplementary service setting update success, and transmit the message to a User Equipment originating the supplementary service setting change via the third interface.

22. The synch server of claim 11, wherein the synch function module is further configured to timestamp and log each supplementary service setting update operation.

23. A telecommunication database synchronization method, comprising:
  receiving a Mobile Applications Part (MAP) message containing a change to a supplementary service setting associated with a User Equipment (UE) connected to a Circuit-Switched (CS) network, and communicating the change to the supplementary service setting via a synch server to both a Home Location Register (HLR) of the CS network and a Home Subscriber Server of an IP-Multimedia Subsystem (IMS) network so that the supplementary service settings in both the HLR and the HSS are updated to reflect the change to the supplementary service setting; and
  receiving an Extensible Markup Language (XML) Configuration Access Protocol (XCAP) message containing a change to a supplementary service setting associated with a User Equipment (UE) connected to the IMS network, and communicating the change to the supplementary service setting via a synch server to both the HLR and the HSS so that the supplementary service settings in both the HLR and the HSS are updated to reflect the change to the supplementary service setting.

24. The method of claim 23 further comprising:
  receiving the MAP message, via a first interface, related to the change to a supplementary service setting associated with a subscriber and the UE;
  forwarding the received MAP message to the HLR;
  receiving a response from the HLR indicative of successful supplementary service setting update in the HLR;
  generating an Sh command related to the change to the supplementary service setting related to the subscriber in the received MAP message;
  forwarding the Sh command to the HSS via a second interface; and
  receiving a response from the HSS indicative of successful supplementary service setting update in the HSS.

25. The method of claim 23 further comprising:
  receiving the XCAP message, via a third interface, related to a change to a supplementary service setting associated with a subscriber and the HE;
  generating an Sh command related to the change to the supplementary service setting related to the subscriber in the received XCAP message;
  forwarding the Sh command to the HSS via the second interface;
  receiving a response from the HSS indicative of successful supplementary service setting update in the HSS;
  generating a MAP message related to the change to the supplementary service setting related to the subscriber in the received XCAP message;
  forwarding the MAP message to the HLR via the first interface; and
  receiving a response from the HLR indicative of successful supplementary service setting update in the HLR.

26. The method of claim 23 further comprising receiving a MAP message related to a change to a supplementary service setting associated with an Any-Time-Modification (ATM) operation, transmit the change to the supplementary service setting in the form of an Sh command and transmit the change to the HSS, and in the form of a MAP message and transmit the change to the HLR.

27. The method of claim 23 further comprising:
  receiving the MAP message, via a first interface, related to the change to a supplementary service setting associated with a subscriber and the UE;
  forwarding the received MAP message to the HLR;
  storing existing supplementary service setting in the HLR;
  receiving a response from the HLR indicative of successful supplementary service setting update in the HLR;
  generating an Sh command related to the change to the supplementary service setting related to the subscriber in the received MAP message;
  forwarding the Sh command to the HSS via a second interface;
  receiving a response from the HSS indicative of error in updating supplementary service setting in the HSS; and
  restoring the existing supplementary service setting in the HLR.

28. The method of claim 23 further comprising:
  receiving the MAP message, via a first interface, related to the change to a supplementary service setting associated with a subscriber and the UE;
  forwarding the received MAP message to the HLR;
  storing existing supplementary service setting in the HLR;
  receiving a response from the HLR indicative of successful supplementary service setting update in the HLR;
  generating an Sh command related to the change to the supplementary service setting related to the subscriber in the received MAP message;
  forwarding the Sh command to the HSS via a second interface;
  receiving a response from the HSS indicative of error in updating supplementary service setting in the HSS; and
  logging HLR and HSS database misalignment.

29. The method of claim 23 further comprising:
receiving the XCAP message, via a third interface, related to a change to a supplementary service setting associated with a subscriber and the UE;
generating an Sh command related to the change to the supplementary service setting related to the subscriber in the received XCAP message;
forwarding the Sh command to the HSS via the second interface;
storing existing supplementary service setting in the HSS;
receiving a response from the HSS indicative of successful supplementary service setting update in the HSS;
generating a MAP message related to the change to the supplementary service setting related to the subscriber in the received XCAP message;
forwarding the MAP message to the HLR via the first interface;
receiving a response from the HLR indicative of error in updating supplementary service setting in the HLR; and
logging HLR and HSS database misalignment.

* * * * *

UNITED STATES PATENT AND TRADEMARK OFFICE
CERTIFICATE OF CORRECTION

PATENT NO. : 9,560,515 B2  
APPLICATION NO. : 14/508078  
DATED : January 31, 2017  
INVENTOR(S) : Carlo Brianza et al.

Page 1 of 1

It is certified that error appears in the above-identified patent and that said Letters Patent is hereby corrected as shown below:

In the Claims

Column 11, Line 44 (Claim 9, Line 4), "My-Time-Modification" should be "Any-Time-Modification"

Signed and Sealed this
Eighteenth Day of April, 2017

Michelle K. Lee
*Director of the United States Patent and Trademark Office*